United States Patent Office 3,457,345
Patented July 22, 1969

3,457,345
ANTITUSSIVE-ENZYME COMPOSITION CONTAINING BROMELAIN
Gustav J. Martin, deceased, late of Philadelphia, Pa., by Dorothy Patricia Martin, administratrix, Philadelphia, Pa., assignor to William H. Rorer, Inc., Fort Washington, Pa., a corporation of Pennsylvania
No Drawing. Continuation-in-part of application Ser. No. 357,755, Apr. 6, 1964. This application July 5, 1967, Ser. No. 651,320
Int. Cl. A61k 9/04, 19/00
U.S. Cl. 424—94     1 Claim

ABSTRACT OF THE DISCLOSURE

Bromelain potentiates the highly effective, non-narcotic antitussive d-methorphan. Both bromelain and d-methorphan hydrobromide are orally administered simultaneously to a mammal. The compositions and method of treatment of this invention are useful in alleviating the symptoms of pertussis, tonsilitis, the common colds and inflammatory conditions of the upper respiratory tract complicated by severe cough.

Cross-reference to related application

This application is a continuation-in-part of the copending application of applicant, S.N. 357,755, filed Apr. 6, 1964, now abandoned.

Summary

This invention relates to an antitussive-enzyme composition and more particularly to a combination of the antitussive, d-methorphan hydrobromide having a specific action on the cough center, with bromelain.

In this combination, bromelain potentiates the specific action of the antitussive, d-methorphan, which is highly effective, is non-narcotic and does not cause constipation. It is preferred to incorporate this combination in an oral dosage unit, such as a tablet or capsule in which adjuvants and excipients may also be contained in the unit. The dosage unit may be provided with an enteric coating or the bromelain alone can be enterically coated to prevent inactivation of the bromelain by the gastric juices.

For the combination dosage unit, the ratio of d-methorphan to bromelain is in the range of 3:16 to 3:4. The bromelain per se or the entire composition is enterically coated to prevent the inactivation of the bromelain by the gastric juices of the mammal.

To relieve the symptoms of the upper respiratory tract infections complicated by cough in a mammal, such as a dog, afflicted with such symptoms, there is administered simultaneously a quantity of d-methorphan hydrobromide and a quantity of bromelain which is enterically coated. The daily dose is 15 to 240 mg. of d-methorphan hydrobromide and 80 to 320 mg. of bromelain.

Description of preferred embodiment

It has been found that an effective multiple action preparation is an enteric-coated tablet containing d-methorphan hydrobromide and bromelain in conjunction with adjuvants useful in the relief of symptoms other than cough which frequently accompany colds, such as 1-phenylephrine hydrochloride, pyrilamine maleate and homatropine methylbromide.

A preferred dosage unit of this type comprises the following ingredients in the indicated amounts or multiples or submultiples thereof:

|  | Mg. |
|---|---|
| d-Methorphan hydrobromide | 15 |
| Bromelain | 40 |
| 1-Phenylephrine hydrochloride | 5 |
| Pyrilamine maleate | 12.5 |
| Homatropine methylbromide | 1.5 |

The antitussive action of the first two ingredients and the supportive action of the other three may be described as follows:

d-Methorphan hydrobromide is a cough suppressant with specific action on the cough center. In the relief of cough it equals or surpasses codeine on a milligram basis, but d-methorphan is a non-narcotic and does not cause constipation.

Bromelain is a proteolytic agent and degrades large molecules of proteinaceous material such as mucin, thereby decreasing the viscosity and increasing the fluidity of thick respiratory secretions. This action eases the cough and facilitates the efflux of mucus. Bromelain also reduces edematous swelling of inflamed mucosa, thereby decreasing mucosal irritability. In addition, bromelain restores the permeability of small vessel walls by depolymerizing the soft fibrin deposits which are believed to clog them. This increase in permeability facilitates the return into the circulation of tissue edema fluid, and entry of the antitussive components into the tissue.

1-phenylephrine hydrochloride is an optically active, synthetic sympathomimetic amine. It is readily absorbed orally and relieves congestion and swelling of mucosa in the respiratory tract.

Homatropine methylbromide is a parasympatholytic agent. It reduces bronchial spasms and decreases the cough reflex by its action on the tonus of smooth muscle.

Pyrilamine maleate is among the most effective of the commonly used antihistamincs. As an antihistaminic it relieves allergic respiratory manifestations.

Tablets having the above indicated composition may advantageously be administered at a rate of 3–6 tablets daily, depending on the mammals requirements or the individual components varied by this ratio relative to each other. For man, the dosage range for d-methorphan may be taken as 15 mg. to 240 mg. per day, and for bromelain as 80 mg. to 320 mg. per day.

Since all the ingredients of the above described preparation are established compounds and their accepted daily doses known, toxicity tests were carried out only on the combination, with or without bromelain, in terms of multiples of the maximum recommended human daily dose.

In both mice and rats the $LD_{50}$ was found to be between 100 and 200 times the maximum recommended human daily dose for acute toxicity. In subacute tests with rats, no toxic effects were observed on administering 25 times the maximum recommended human daily dose 5 times a week for four weeks. Detailed results of the latter test are shown in Table I.

Tests of the antitussive effect of the preferred dosage unit were carried out on dogs.

(a) Bromelain—d-methorphan.—Initial studies were conducted with dextromethorphan administered orally and bromelain administered via intraperitoneal route. Mongrel dogs (males) were placed in specifically designed chambers and were exposed to aerosols of $NH_2SO_4$ for a five minute period. A microphone placed in the chamber was employed to record coughs which were taped on a Wollensak tape recorder. Control coughs for each animal were obtained prior to the administration of the drug. During the course of the study it was found that repeated exposure of the animal to the sulfuric acid aerosol during the course of a single experiment produced no significant change in their "cough response." It was also found that the same animal could be used for repeated experiments after a one week rest period.

(b) Similar studies were conducted with the preferred dosage unit administered orally. One group of mongrel TABLE I.—4-WEEK TOXICITY OF PREFERRED DOSAGE UNIT WITH AND WITHOUT BROMELAIN—ORAL—RAT

| Group | No. and Sex | Average Weight, Gms. | | | Died |
|---|---|---|---|---|---|
| | | Initial | Final | Change | |
| 10× maximum recommended human dose (no bromelain) | 5-M | 215 | 282 | +67 | 1 |
| | 5-F | 191 | 228 | +37 | 0 |
| 25× maximum recommended human dose (no bromelain) | 5-M | 237 | 337 | +100 | 0 |
| | 5-F | 190 | 238 | +48 | 0 |
| 10× maximum recommended human dose plus bromelain 10× | 5-M | 238 | 338 | +100 | 0 |
| | 5-F | 182 | 232 | +40 | 1 |
| 25× maximum recommended human dose plus bromelain 25× | 5-M | 242 | 347 | +105 | 0 |
| | 5-F | 196 | 253 | +57 | 1 |
| Bromelain control 25× human dose | 5-M | 233 | 340 | +107 | 0 |
| | 5-F | 173 | 240 | +67 | [1] 2 |
| Water-treated controls | 5-M | 216 | 320 | +104 | 0 |
| | 5-F | 165 | 225 | +40 | 0 |

[1] Deaths due to trauma from force-feeding.

dogs received the combination without bromelain and a second group received the material with the enzyme. In each case the drug was administered at a level equivalent to the maximum daily recommended human oral dose. The drug was incorporated into capsules which were subsequently coated with 10% cellulose acetate phthalate (in acetone) as the enteric coating. Details of the procedure and results are shown in the following table.

the described preferred dosage unit, it substantially potentiated the action of the other ingredients.

The new combination is useful in alleviating the symptoms of pertussis, tonsilitis, the common cold, bronchitis, bronchiectasis and inflammatory conditions of the upper respiratory tract complicated by severe cough. At the start of treatment one tablet of the above described dosage unit may be taken every three or four hours as re- TABLE II.—ANTITUSSIVE EFFECTS OF D-METHORPHAN AND PREFERRED DOSAGE UNIT IN DOGS AVERAGE AND RANGE

| Dose | No. Animals | Mean Cough Response | | | | Mean Percent [Inhibition of Cough | | |
|---|---|---|---|---|---|---|---|---|
| | | 0 | 1 Hour | 3 Hours | 5 Hours | 1 Hour | 3 Hours | 5 Hours |
| A ..... 0.5 mg./kg., p.o. | 5 | 49 / 25-93 | 34 / 14-68 | 29 / 12-56 | 38 / 8-85 | 33 / 28-44 | 41 / 27-52 | 40 / 8-68 |
| B ..... 0.5 mg./kg., p.o. / 3.8 mg./kg., i.p. | 9 | 46 / 16-59 | 20 / 9-44 | 17 / 6-39 | 24 / 9-41 | 52 / 17-74 | 57 / 25-95 | 51 / 23-65 |
| A ..... 1.0 mg./kg., p.o. | 5 | 60 / 21-110 | 20 / 8-53 | 25 / 12-48 | 17 / 15-20 | 60 / 36-89 | 40 / 6-87 | 44 / 20-83 |
| B ..... 1.0 mg./kg., p.o. / 3.8 mg./kg., i.p. | 5 | 80 / 23-143 | 40 / 4-94 | 36 / 3-82 | 25 / 5-64 | 53 / 14-83 | 58 / 25-86 | 65 / 54-78 |
| C ..... 1× maximum human daily dose, p.o. | 9 | 53 / 26-89 | 39 / 18-66 | 32 / 13-62 | 37 / 14-68 | 22 / 12-35 | 40 / 28-59 | 34 / 18-45 |
| D ..... 1× maximum human daily dose, p.o. | 10 | 47 / 18-110 | 30 / 11-69 | 30 / 9-84 | 29 / 11-88 | 39 | 41 / 24-64 | 43 / 20-66 |
| E ..... 3.8 mg./kg., Oral | 6 | 42 / 17-74 | 37 / 12-79 | 34 / 21-63 | 30 / 16-44 | 19 / 0-38 | 19 / 0-38 | 24 / 0-49 |
| F ..... 3.8 mg./kg., i.p. | 4 | 34 / 25-48 | 7 / 3-12 | 12 / 5-19 | 18 / 8-22 | 79 / 75-89 | 65 / 45-81 | 48 / 37-70 |
| G | 6 | 27 / 14-47 | 24 / 10-35 | 26 / 9-43 | 25 / 15-44 | | | |

A is d-methorphan
B is d-methorphan+bromelain
C is enteric coated preferred dosage unit without bromelain
D is enteric coated preferred dosage unit with bromelain
E is enteric coated bromelain
F is bromelain
G is untreated controls When administered intraperitoneally bromelain showed antitussive activity and potentiated the activity of orally administered d-methorphan. When administered alone orally in enteric coated units, its effect was reduced, but when administered in enteric coated tablets as part of quired, but not more than six should be taken in one 24-hour period.

Contraindications are those well known for the individual constituents.

What is claimed is:

1. An oral antitussive-enzyme composition comprising the following ingredients in the indicated amounts:

| | Mg. |
|---|---|
| d-Methorphan hydrobromide | 15 |
| Bromelain | 40 |
| l-phenylephrine hydrobromide | 5 |
| Pyrilamine maleate | 12.5 |
| Homatropine methylbromide | 1.5 |

References Cited

UNITED STATES PATENTS 2,887,435  5/1959  Witty.
3,108,041  10/1963  Weiner.
3,224,942  12/1965  Martin.

OTHER REFERENCES

Goodman et al., The Pharmacological Basis of Therapeutics, second edition, The MacMillan Co., 1955, New York, pp. 656–664.

ALBERT T. MEYERS, Primary Examiner

JEROME D. GOLDBERG, Assistant Examiner

U.S. Cl. X.R.

424—263, 265, 267, 330